(12) United States Patent
Basso et al.

(10) Patent No.: US 9,940,748 B2
(45) Date of Patent: Apr. 10, 2018

(54) METHOD AND APPARATUS FOR MULTI-EXPERIENCE ADAPTATION OF MEDIA CONTENT

(71) Applicant: AT&T Intellectual Property I, LP, Atlanta, GA (US)

(72) Inventors: Andrea Basso, Turin (IT); Tara Hines, New York, NY (US); Aleksey Ivanov, Middletown, NJ (US); Jeffrey Mikan, Atlanta, GA (US); Nadia Morris, Pacifica, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 537 days.

(21) Appl. No.: 14/568,076

(22) Filed: Dec. 11, 2014

(65) Prior Publication Data

US 2015/0097835 A1 Apr. 9, 2015

Related U.S. Application Data

(63) Continuation of application No. 13/185,487, filed on Jul. 18, 2011, now Pat. No. 8,943,396.

(51) Int. Cl.
*G06F 17/21* (2006.01)
*G06T 15/50* (2011.01)
(Continued)

(52) U.S. Cl.
CPC ............ *G06T 15/506* (2013.01); *A63F 13/65* (2014.09); *G06Q 10/00* (2013.01); *G06Q 30/02* (2013.01);
(Continued)

(58) Field of Classification Search
CPC .................................................. G06T 15/506
(Continued)

(56) References Cited

U.S. PATENT DOCUMENTS 5,252,951 A 10/1993 Tannenbaum
5,572,635 A 11/1996 Takizawa et al.
(Continued)

FOREIGN PATENT DOCUMENTS

JP 64032332 U 2/1989

OTHER PUBLICATIONS

Mangiat, Stephen, and Jerry Gibson. "Automatic scene relighting for video conferencing." Image Processing (ICIP), 2009 16th IEEE International Conference on. IEEE, 2009. (Year: 2009).*
(Continued)

*Primary Examiner* — Frank D Mills
(74) *Attorney, Agent, or Firm* — Guntin & Gust, PLC; Douglas Schnabel

(57) ABSTRACT

A method or apparatus that incorporates teachings of the present disclosure may include, for example, a method for adapting media content of a source device for a recipient device. Characteristics of a first environment of a source device and of a second environment of a recipient can be identified. At least one difference between the characteristics of the first environment of the source device and the characteristics of the second environment of the recipient device can be determined. A presentation of media content can be modified according to the at least one difference between the characteristics of the first environment of the source device and the characteristics of the second environment of the recipient device. Other embodiments are disclosed.

20 Claims, 7 Drawing Sheets

(51) Int. Cl.
| | | |
|---|---|---|
| *G06Q 10/00* | (2012.01) | |
| *G06Q 30/02* | (2012.01) | |
| *H04L 29/06* | (2006.01) | |
| *H04N 21/2343* | (2011.01) | |
| *H04N 21/422* | (2011.01) | |
| *H04N 21/4402* | (2011.01) | |
| *H04N 21/4788* | (2011.01) | |
| *H04N 21/61* | (2011.01) | |
| *H04N 21/658* | (2011.01) | |
| *A63F 13/65* | (2014.01) | |
| *H04N 21/234* | (2011.01) | |
| *H04N 21/44* | (2011.01) | |
| *H04N 21/478* | (2011.01) | |
| *H04N 21/647* | (2011.01) | |

(52) U.S. Cl.
CPC ...... *H04L 65/1016* (2013.01); *H04L 65/4076* (2013.01); *H04L 65/602* (2013.01); *H04L 65/604* (2013.01); *H04L 65/605* (2013.01); *H04N 21/2343* (2013.01); *H04N 21/23412* (2013.01); *H04N 21/42202* (2013.01); *H04N 21/4402* (2013.01); *H04N 21/44012* (2013.01); *H04N 21/4788* (2013.01); *H04N 21/6125* (2013.01); *H04N 21/6175* (2013.01); *H04N 21/6582* (2013.01); *G06T 2215/16* (2013.01); *H04N 21/4781* (2013.01); *H04N 21/64707* (2013.01)

(58) Field of Classification Search
USPC .......................................................... 715/202
See application file for complete search history.

(56) References Cited

U.S. PATENT DOCUMENTS

| | | | |
|---|---|---|---|
| 5,821,989 A | 10/1998 | Lazzaro et al. | |
| 5,963,371 A | 10/1999 | Needham et al. | |
| 6,080,063 A * | 6/2000 | Khosla | A63F 13/10 463/42 |
| 6,172,719 B1 | 1/2001 | Kim | |
| 6,272,127 B1 | 8/2001 | Golden et al. | |
| 6,466,234 B1 | 10/2002 | Pyle et al. | |
| 6,466,334 B1 * | 10/2002 | Komiya | H04N 1/603 358/1.9 |
| 6,529,209 B1 | 3/2003 | Dunn et al. | |
| 6,912,429 B1 | 6/2005 | Bilger | |
| 6,959,389 B1 | 10/2005 | Dunn et al. | |
| 6,980,177 B2 | 12/2005 | Struyk | |
| 7,092,037 B2 | 8/2006 | Huh et al. | |
| 7,191,338 B2 | 3/2007 | Stern et al. | |
| 7,319,755 B2 | 1/2008 | Struyk | |
| 7,613,310 B2 | 11/2009 | Mao | |
| 7,680,295 B2 | 3/2010 | Yoda | |
| 7,805,017 B1 | 9/2010 | Basso et al. | |
| 7,843,486 B1 | 11/2010 | Blair et al. | |
| 8,016,653 B2 * | 9/2011 | Pendleton | A63F 13/10 463/31 |
| 8,091,038 B1 | 1/2012 | Johnson et al. | |
| 8,138,930 B1 | 3/2012 | Heath | |
| 8,207,846 B2 | 6/2012 | Van Hoff et al. | |
| 8,255,957 B1 | 8/2012 | Mattox et al. | |
| 8,324,826 B2 | 12/2012 | Verberkt et al. | |
| 8,346,376 B2 | 1/2013 | Engelen et al. | |
| 8,403,105 B2 | 3/2013 | Lee et al. | |
| 8,463,408 B2 | 6/2013 | Boleko Ribas | |
| 8,560,955 B2 | 10/2013 | Jana et al. | |
| 8,565,905 B2 | 10/2013 | Engelen | |
| 8,634,597 B2 | 1/2014 | Ivanov et al. | |
| 8,780,161 B2 | 7/2014 | Samadani et al. | |
| 2002/0004918 A1 | 1/2002 | Mathieu et al. | |
| 2002/0180973 A1 | 12/2002 | MacKinnon et al. | |
| 2003/0118183 A1 | 6/2003 | Struyk | |
| 2005/0120128 A1 | 6/2005 | Willes et al. | |
| 2005/0275626 A1 | 12/2005 | Mueller et al. | |
| 2006/0034487 A1 * | 2/2006 | Franz | H04N 13/0246 382/104 |
| 2006/0041758 A1 | 2/2006 | Dunn et al. | |
| 2007/0121958 A1 | 5/2007 | Berson | |
| 2007/0146494 A1 | 6/2007 | Goffin et al. | |
| 2007/0257928 A1 | 11/2007 | Marks et al. | |
| 2008/0021963 A1 | 1/2008 | Jana et al. | |
| 2008/0144967 A1 | 6/2008 | Struyk | |
| 2008/0218501 A1 * | 9/2008 | Diamond | G09G 3/22 345/207 |
| 2008/0235587 A1 | 9/2008 | Heie et al. | |
| 2008/0316372 A1 | 12/2008 | Xu et al. | |
| 2008/0318683 A1 | 12/2008 | Rofougaran et al. | |
| 2009/0046140 A1 | 2/2009 | Lashmet et al. | |
| 2009/0079813 A1 | 3/2009 | Hildreth et al. | |
| 2009/0087161 A1 | 4/2009 | Roberts et al. | |
| 2009/0109129 A1 * | 4/2009 | Cheong | G09G 5/02 345/20 |
| 2009/0195670 A1 | 8/2009 | Koishi | |
| 2009/0244364 A1 | 10/2009 | Nonogaki | |
| 2009/0253512 A1 | 10/2009 | Nickell et al. | |
| 2009/0262946 A1 | 10/2009 | Dunko | |
| 2009/0300525 A1 | 12/2009 | Jolliff et al. | |
| 2010/0004918 A1 | 1/2010 | Lee | |
| 2010/0026794 A1 | 2/2010 | Chang | |
| 2010/0027961 A1 | 2/2010 | Gentile et al. | |
| 2010/0049476 A1 | 2/2010 | Engelen et al. | |
| 2010/0079426 A1 * | 4/2010 | Pance | G06T 11/001 345/207 |
| 2010/0079585 A1 | 4/2010 | Nemeth | |
| 2010/0090617 A1 | 4/2010 | Verberkt et al. | |
| 2010/0125800 A1 | 5/2010 | Jana et al. | |
| 2010/0134050 A1 | 6/2010 | Engellen et al. | |
| 2010/0277452 A1 * | 11/2010 | Muraki | H04N 5/202 345/207 |
| 2010/0283393 A1 | 11/2010 | Boleko Ribas | |
| 2010/0284525 A1 | 11/2010 | Sander et al. | |
| 2010/0299445 A1 | 11/2010 | Amsterdam et al. | |
| 2010/0302138 A1 | 12/2010 | Poot et al. | |
| 2010/0318201 A1 | 12/2010 | Cuppen et al. | |
| 2011/0109250 A1 | 5/2011 | Engelen | |
| 2011/0204793 A1 | 8/2011 | Gardner, Jr. | |
| 2011/0232989 A1 | 9/2011 | Lee et al. | |
| 2012/0019633 A1 | 1/2012 | Holley | |
| 2012/0047023 A1 | 2/2012 | Kruglick | |
| 2012/0069131 A1 | 3/2012 | Abelow et al. | |
| 2012/0099641 A1 | 4/2012 | Bekiares et al. | |
| 2012/0135783 A1 | 5/2012 | Sams | |
| 2012/0140019 A1 | 6/2012 | Jung et al. | |
| 2012/0224019 A1 | 9/2012 | Samadani et al. | |
| 2016/0342221 A1 | 11/2016 | Basso et al. | |
| 2016/0381098 A1 | 12/2016 | Basso et al. | |

OTHER PUBLICATIONS

"PlayStation 3 System Software User's Guide", Jan. 13, 2007; Playstation.net; pp. 1-2.

Kansal, Aman, "Biuetooth Primer", 30 pages (2002) available at http://www .eng. wayne.edu/~smahmud/BiuetoothWeb/BT oothTutorial.pdf.

Lee, Johnny C. et al., "Automatic projector calibration with embedded light sensors", In Proceedings of the 17th annual ACM symposium on User interface software and technology, ACM, 2004, 123-126.

Wiley, M., "Logitech Cordless Action Controller Review", Jun. 10, 2004; IGN.com; pp. 1-9.

* cited by examiner

700

METHOD AND APPARATUS FOR MULTI-EXPERIENCE ADAPTATION OF MEDIA CONTENT

CROSS REFERENCE TO RELATED APPLICATION

This application claims priority to U.S. patent application Ser. No. 13/185,487, filed Jul. 18, 2011. All sections of the aforementioned application are incorporated herein by reference.

FIELD OF THE DISCLOSURE

The present disclosure relates generally to media content and more specifically to a multi-experience translation of media content

BACKGROUND

Media content is generally experienced by consumers via devices such as computers, televisions, radios, and mobile electronics. Media content is frequently delivered by service providers, who send media content, such as television programming, radio, and video, directly to consumers for enjoyment at their physical location. Service providers also often provide access to the internet and to internet-based media content, such as websites, games, social networking, and virtual-reality applications. Consumer media content experiences can be affected by their sensory environment.

DETAILED DESCRIPTION

Figure 1:
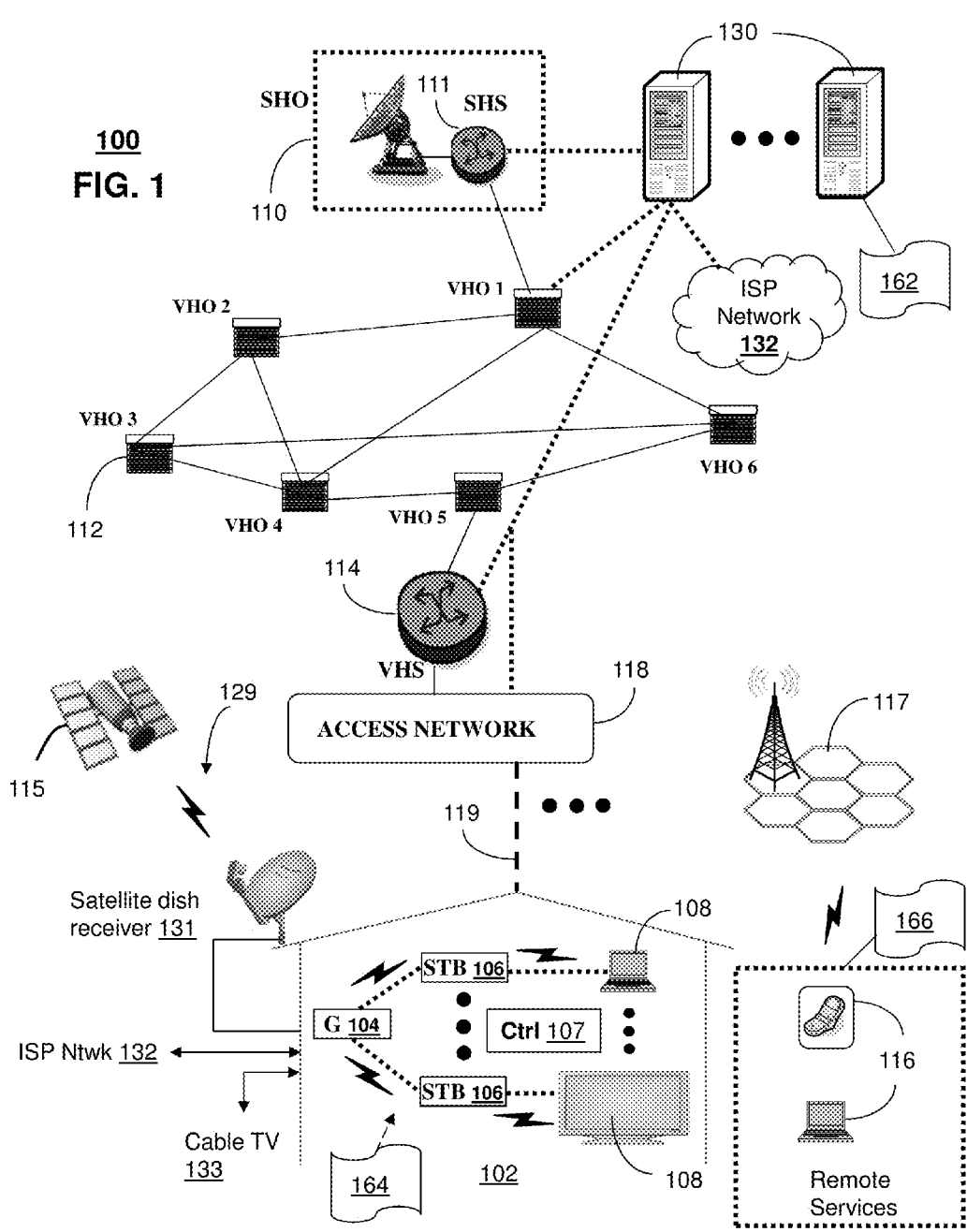
FIGS. 1-2 depict illustrative embodiments of communication systems that provide media services.

The present disclosure describes, among other things, illustrative embodiments for adaptation of media content in accordance with a consumer sensory environment. In one embodiment, differences between sensory environments between a source device and a recipient device are used for media content adaptation. Other embodiments are contemplated by the present disclosure.

One embodiment of the present disclosure includes a recipient device having a memory and a processor. The processor can be operable to receive sensory data representing a plurality of characteristics of an environment of a source device. The processor can also be operable to retrieve sensory information from an environment of the recipient device. The processor can further be operable to identify a plurality of characteristics of the environment of the recipient device from the sensory information. The processor can be operable to determine at least one difference between the plurality of characteristics of the environment of the source device and the plurality of characteristics of the environment of the recipient device. The processor can also be operable to receive media content from the source device. The processor can be further operable to modify a presentation of the media content according to the at least one difference between the plurality of characteristics of the environment of the source device and the plurality of characteristics of the environment of the recipient device.

One embodiment of the present disclosure includes a device having a memory and a processor. The processor can be operable to receive first sensory data representing a plurality of characteristics of an environment of a source device. The processor can also be operable to receive second sensory data representing a plurality of characteristics of an environment of a recipient device. The processor can further be operable to determine at least one difference between the plurality of characteristics of the environment of the source device and the plurality of characteristics of the environment of the recipient device. The processor can be operable to receive media content from the source device. The processor can also be operable to modify a presentation of the media content according to the at least one difference between the plurality of characteristics of the environment of the source device and the plurality of characteristics of the environment of the recipient device. The processor can be operable to provide the adapted media content to the recipient device over a communication system.

One embodiment of the present disclosure includes a method where a plurality of characteristics of an environment of a source device can be identified. A plurality of characteristics of an environment of a recipient device can also be identified. In turn, at least one difference between the plurality of characteristics of the environment of the source device and the plurality of characteristics of the environment of the recipient device can be determined. A presentation of media content submitted from the source device to the recipient device can be modified according to at least one difference between the plurality of characteristics of the environment of the source device and the plurality of characteristics of the environment of the recipient device.

FIG. 1 depicts an illustrative embodiment of a first communication system 100 for delivering media content. The novel communication system 100 can collect sensory data characterizing environments at a source device and a recipient device. The communication system 100 can compare the environmental characteristics of the source device with environmental characteristics at the recipient device to detect differences. The communication system 100 can use these differences to modify presentation of the media content from the source device that can be delivered at the recipient device.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or portable communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a media content adaptation server (herein referred to as server 130). The server 130 can use common computing and communication technology to perform function 162, which includes among things, modification of media content in accordance with a consumer's environment. The server 130 can be used to receive sensory data representing characteristics of an environment of a source device, such as one of the media processors 106, media devices 108, or portable communication devices 116. The server 130 can also be used to receive sensory data representing characteristics of an environment of a recipient device, such as another of the media processors 106, media devices 108, or portable communication devices 116. The server 130 can further be used to determine differences between the characteristics of the first and second sensory environments. The server 130 can be used to modify a presentation of media content according to the differences between the characteristics of the first and second sensory environments. The server 130 can further be used to provide the modified media content to the recipient device over the communication system 100. The media processors 106 and portable communication devices 116 can be adapted with software functions 164 and 166, respectively, to further utilize the services of the server 130. For example, the media processors 106 and portable communication devices 116 can be adapted to execute software functions 164 and 166, respectively, to collect and report sensory data to the server 130 representing characteristics of the environments of the media processors 106 and portable communication devices 116, respectively.

Figure 2:
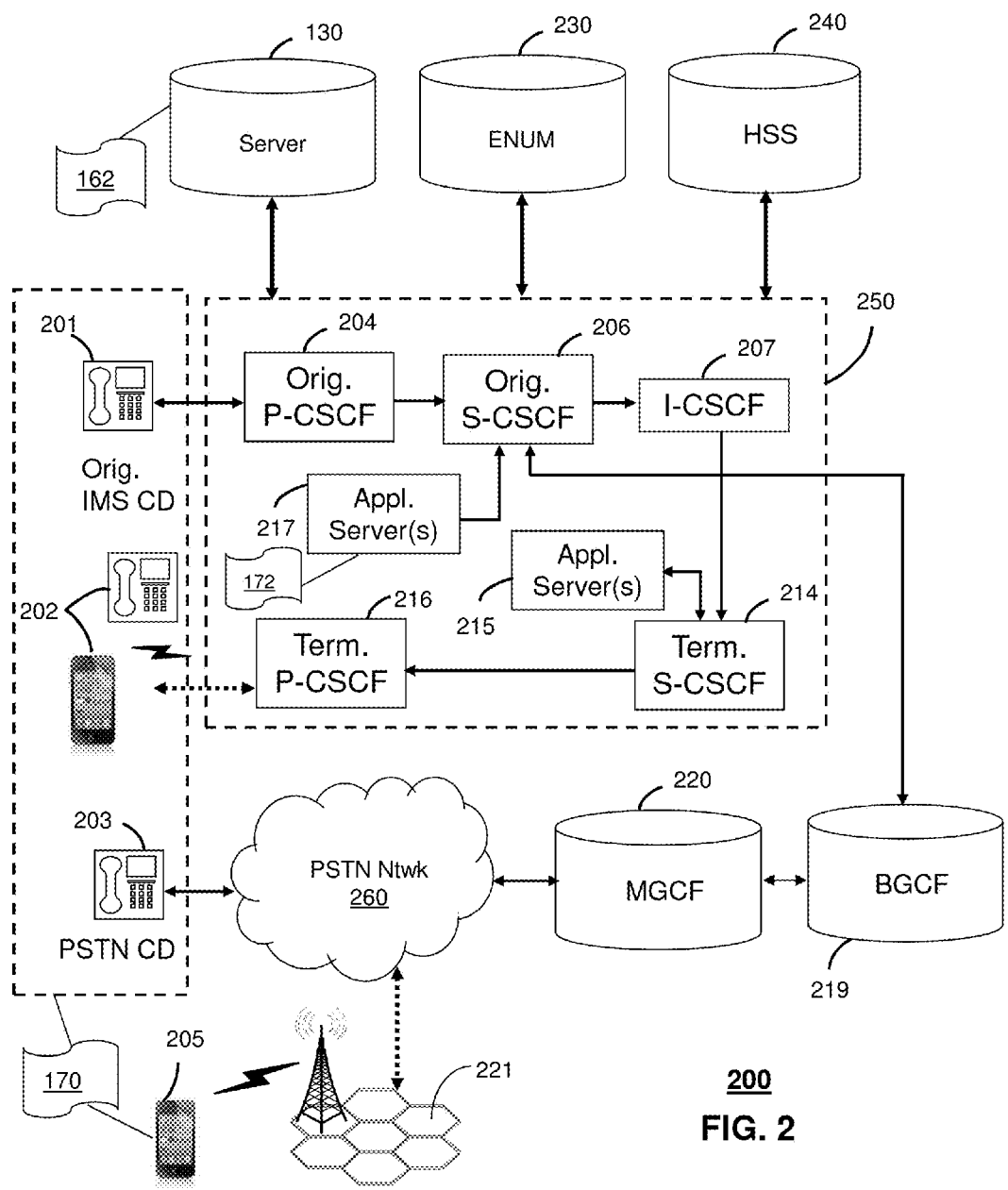

FIG. 2 depicts an illustrative embodiment of a communication system 200 employing IP Multimedia Subsystem (IMS) network architecture to facilitate the combined services of circuit-switched and packet-switched systems. Communication system 200 can be overlaid or operably coupled with communication system 100 as another representative embodiment of communication system 100. The novel communication system 200 can be adapted to collect sensory data characterizing environments at a source device and a recipient device and to compare the environmental characteristics of the source device with the environmental characteristics at the recipient device to detect differences. The novel communication system 200 can also be adapted to use these differences to modify presentation of the media content from the source device that can be delivered at the recipient device.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

Communication system 200 can include or otherwise be coupled with server 130 of FIG. 1 for purposes similar to those described above. It is further contemplated by the present disclosure that the server 130 can perform the function 162 and thereby provide a media content adaptation application for subscribers associated with CDs 201, 202, 203, and 205. CDs 201, 202, 203, and 205 can be adapted with software to perform function 170 to utilize and integrate with the multi-experience adaptation application performed by the server 130. It is further contemplated that the server 130 can be an integral part of the application server(s) 217, where the application server(s) 217 performs function 172, which can be substantially similar to function 162 and adapted to the operation of the IMS network 250.

Figure 3:
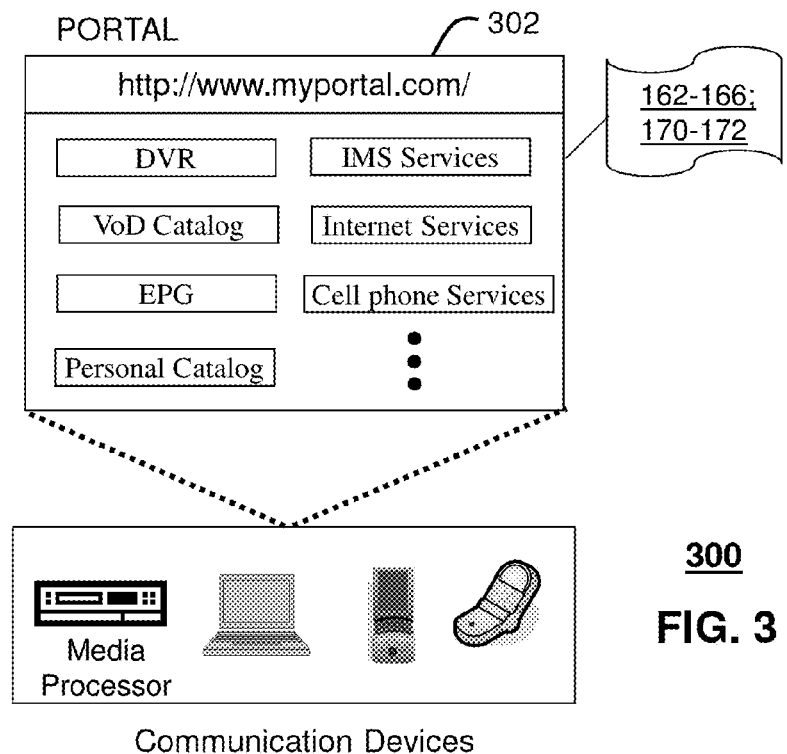
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-172 of the devices of FIGS. 1-2, respectively, as described earlier.

Figure 4:
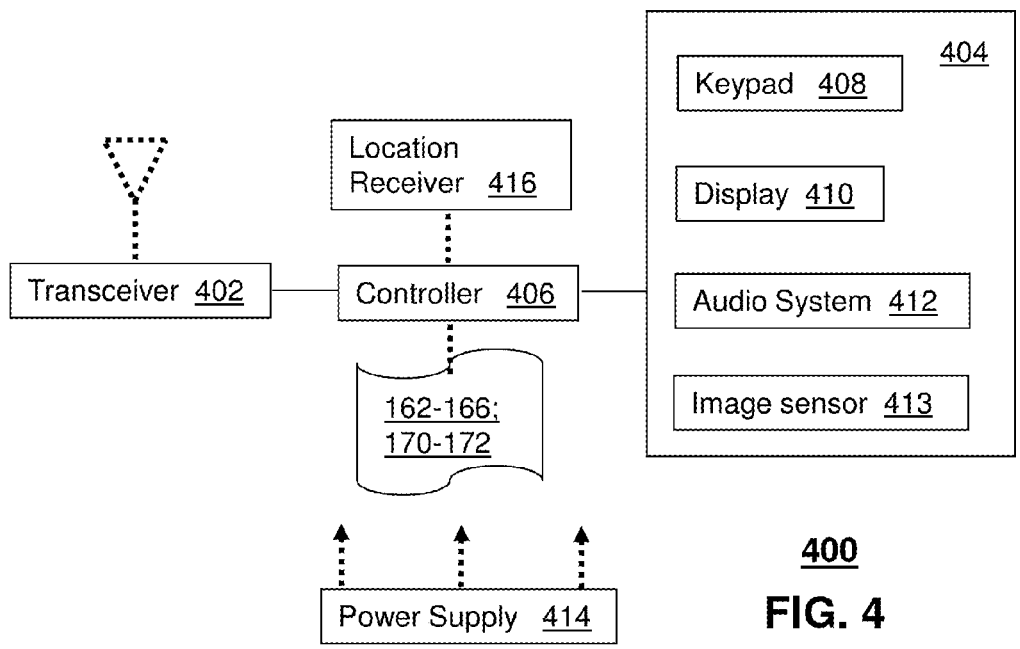
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The novel communication device 400 can capture sensory data corresponding to environmental characteristics at the communication device. The novel communication device 400 can transmit the environmental characteristics to another communication device or to a server 100-200. The novel communications device 400 can adapt its graphical user interface to account for differences in environmental conditions. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Illustrative embodiments of methods that can operate in portions of the communication device of FIG. 4 are described below.

Figure 5:
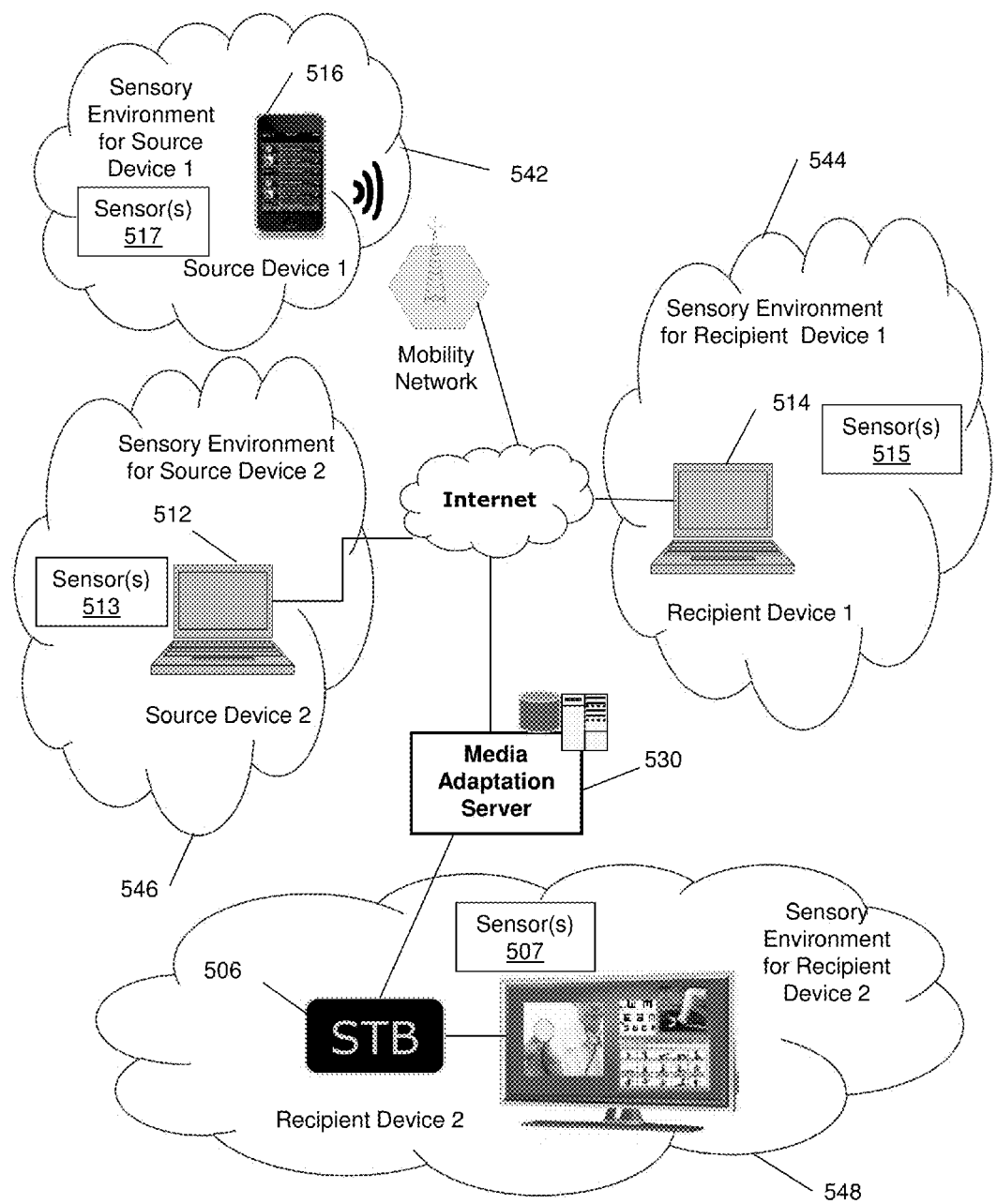
FIG. 5 depicts an illustrative embodiment of a system.

FIG. 5 depicts an illustrative embodiment of a system 500 for adaptation of media content in accordance with a user's sensory environment. System 500 can be overlaid or operably coupled to communication systems 100-200 as another representative embodiment of communication systems 100-200. System 500 can include a server 530 in communication with media processors 506 (such as set-top boxes), computing devices 512 and 514 (such as a laptop computer, tablet, etc.), and wireless communication devices 516 (such as mobile phones, smart phones, etc.). The mobile devices 516 can be communicatively coupled to the server 530 by way of a mobility network coupled to the Internet or other communication means. The computing devices 512 can also be communicatively coupled to the server 530 by way of the Internet or other communication means.

The present disclosure contemplates a server 530 that among other things is capable of modifying media content in accordance with a user's sensory environment. The server 530 can be used to receive first sensory data representing characteristics of an environment 542 of a first source device 516. The server 530 can also be used to receive second sensory data representing characteristics of a second sensory environment 544 of a first recipient device 514. The server 530 can further be used to determine differences between the characteristics of the environments 542 and 544 of the first source device 516 and the first recipient device 514. The server 530 can be used to receive media content from the first source device 516. The server 530 can further be used to modify a presentation of the media content according to the differences between the characteristics of the environments 542 and 544 of the first source device 516 and the first recipient device 514. The server 530 can further be used to provide the modified media content to the first recipient device 514 over the communication system 100. In one example, the first source device 516 can be a wireless or mobile communications device coupled to the communications system 100 through a mobility network. The first recipient device 514 can be a computing device. In another example, a second source device 512 can be a computing device while a second recipient device 506 can be a media processor, such as a set-top box, that presents the media content on a display device.

Each of environments 542-548 can comprise sensors 507, 513, 515 and 517 to provide server 530 sensor data. The sensors can be virtual or physical. In an embodiment where the sensors 507, 513, 515 and 517 are physical sensors, these sensors can utilize technology that provides the server 530 sensory information that includes without limitation temperature, weather, lighting, color, images, video, audio, location information, time, season of the year, aroma, and type of establishment from which the source or recipient device is operating. Virtual sensors can be an integral part of a virtual application operating in the source or recipient devices. A virtual application in the present context can represent a video game, virtual game such as Second Life™, an application including avatars, or a social media application. The virtual sensors can also provide the server 530 sensory information such as temperature, weather, lighting, color, images, video, audio, location information, time, season of the year, aroma, and type of establishment presented by the virtual application. Other forms of sensory data such a motion data (velocity, acceleration, etc.), orientation data (e.g., compass information) and other forms of virtual applications are contemplated by the present disclosure.

Figure 6:
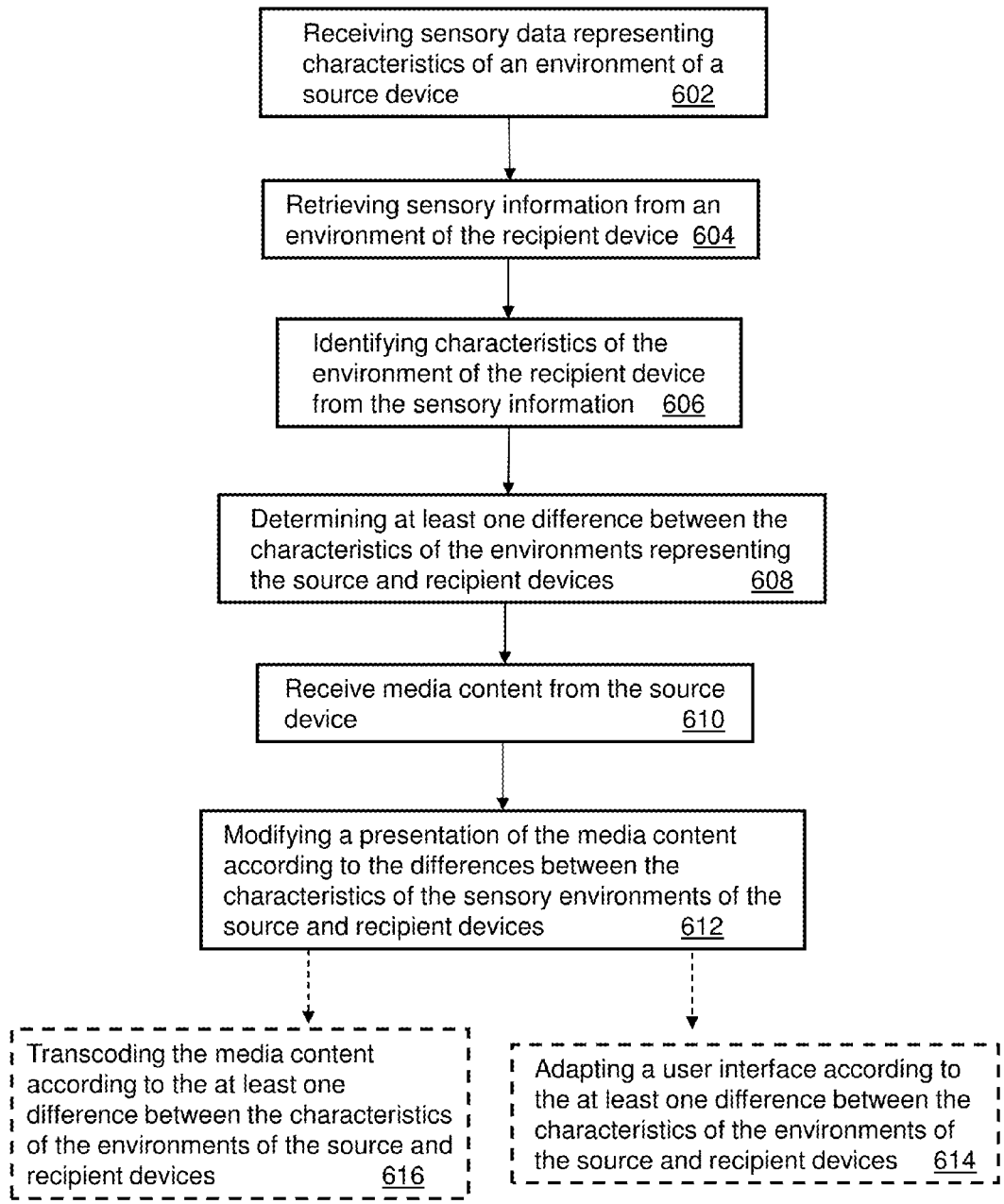
FIGS. 6-7 depicts an illustrative embodiment of a method operating in portions of the systems described in FIGS. 1-5.

FIG. 6 depicts an illustrative method 600 that operates in portions of the devices of FIGS. 1-5. Method 600 can begin with step 602 in which a recipient device 506, 514 can receive sensory data representing characteristics of an environment of a source device 512, 516. The recipient device 506, 514 can be a media processor 106, such as a set-top box. The media processor 106 can be connected to the communication system 100 via a gateway 104. The media processor 106 can deliver media content from the communication system 100 to a media device 108, such as a television or a computing device. The recipient device 506, 514 can be a portable communication device 116, such as a computing device, wireless computing device, or mobile communications device, and can receive media content from the communication system 100 via a mobility network. As with the recipient device 506, 514, the source device 512, 516 can also be a media processor 106, such as a set-top box, and can be connected to the communication system 100 via a gateway 104. The source device 512, 516 can be a portable communication device 116, such as a computing device, wireless computing device, or mobile communications device, and can receive media content from the communication system 100 via a mobility network.

Sensory data can represent an environment 542, 546 of the source device 512, 516 or an environment 544, 548 of a recipient device 506, 514. Sensory data representing characteristic of the environment of the source or recipient device can be derived from a "world" in which the device is operating. This "world" can be a physical world or a virtual world. A physical world for a source or recipient device can be described as environmental conditions that can be physically experienced by one consuming media content at the source or recipient device. The sensory data can be derived in a physical environment from sensors 507, 513, 515 and 517 described earlier. A virtual world for a source or recipient device can be described as environmental conditions presented by the source or recipient device for a consumer of virtual content to virtually experience. Physical and virtual worlds and the collection, distribution, and use of sensory data representing a physical or virtual environment are further described below with respect to a source device 512, 516. However, it is to be understood that similar sensory data can be collected, distributed, and used for representing a physical or virtual environment for a recipient device 506, 514.

The physical world can be described as a collection of environmental conditions and can be assessed by measuring and collecting sensory data representing these environmental conditions. For example, sensory data can represent sensory information relating to lighting, temperature, colors, background audio, video, images, and location details, such as room spatial features, time-zone, season, and type of establishment (home or commercial enterprise). The source device 512, 516 can be described as operating in a sensory environment 546, 542 that includes a compilation of sensory data for the physical world of the source device. For example, temperature, light intensity, and colorimetric data, aromatic data, background audio, video, and still images, and location information can be collected at the source device 512, 516. Sensory data for the sensory environment 546, 542 can be captured and/or compiled by sensors 513 and 517 operating in the source device 512, 516, or by other devices coupled to the communication system 100, or by a combination of both. Sensory data can detect characteristics, such as sound levels or lighting, that are consistent with of home or commercial environments to thereby detect and report a type of establishment.

The sensory data of the physical environment for the source device 512, 516 can be translated into a standard format before being communicated to the recipient device 506, 514 or to the media adaptation server 530. For example, raw temperature data can be initially collected at the source device 512, 516 by direct sensing using a thermo probe. The raw temperature data can be converted into a series of digital readings, statistically converted to a mean temperature or median temperature or range of temperatures as needed. A single temperature, such as the mean or median, or a temperature range can then be reported from the source device 512, 516 and received at the recipient device 506, 514, or server 530. A similar approach can be used for other sensory data, such as light intensity, colorimetric data, aromatic data, or volume of background sound or audio.

The sensory data of the physical environment for the source device 512, 516 can include audio, video, and still images. For example, a painting might appear on a wall at the location of the source device. This painting represents a sensory aspect of the physical environment that can be replicated exactly or in modified form at a recipient device 506, 514. The painting image can be captured at the source device 512, 516, by means of, for example, a camera device. The captured image can be saved as an image file, such as a Joint Photographic Experts Group, or JPEG, image file, or as another image file format. Similarly, background audio content, such as recorded or live music or soundtrack, ambient noise, or any combination of sound present at the source device 512, 516, can be captured by means of, for example, a microphone device. The captured sound can be saved as a sound file, such as a Moving Picture Experts Group, or MPEG, sound file, or as another image file format. Similarly, background video or a combination of video and audio or of video, audio, and still images can be captured at the source device. For example, a video camera or a combination of a video camera and microphone could be used to capture video of the environment of the source device 512, 516. Video data can be saved, for example, as MPEG video files.

The sensory data of the physical environment for the source device 512, 516 can include location information. For example, the location of the source device 512, 516 can be captured by accessing Global Positioning System (GPS) satellite services. If the source device 512, 516 is physically attached to the communication system 100, then its location can be determined by reference to the location of other entities of known locations. For example, if the source device 512, 516 is connected to a router in a building of known location, then the location of the building can be reported as the location. If the source device 512, 516 accesses the communication system via a component of a mobility network 117, such as specific cell tower, then the location of the mobility network component can be used.

The sensory data of the physical environment of the source device 512, 516 can be provided to the recipient device 512, 514 or the media adaptation server 530. The sensory data can be sent as streaming data, files, or messages. The sensory data can be continuously updated or can be periodic snapshots of environmental conditions. For example, temperature can reported each hour or can reported continuously with each data transmission. Video data can be sent as a continuous stream or can be converted into a series of still image snapshots to conserve system bandwidth.

Sensory data representing a virtual "world" of a source device 512, 516 can include environmental components that can be experienced virtually by one consuming virtual media content at the source device 512, 516. A virtual world can be an environment that is presented by the source device 512, 516 as part of some type of virtual media content. Virtual media content can include video game applications, virtual world applications, applications that include avatars, social media applications, and websites. Virtual media content can incorporate scenarios, perspectives, and role-playing attributes that allow a consumer of the virtual media content to mentally experience various aspects of another world, persona, or reality. Virtual media content can include virtual representations of otherwise physical phenomena, such as lighting, temperature, color, aroma, sound, movement, video, images, and spatial relationships. This "virtual" sensory data imitates physical phenomena within a virtual context to bring a sense or "realness" to the experience for the consumer.

Virtual sensory data representing components of the virtual environment can be available at the source device 512, 516 as digital data that is accessed by a video game or virtual world application executing on the source device. This virtual sensory data for the virtual environment can be accessible by the game or application from graphics data files, MPEG files, JPEG files, and parameter files. The virtual sensory data can also be accessible to the source device 512, 516 by accessing or parsing these files as saved in local storage or as made available from a network source. The source device 512, 516 can be used as a display device that merely reproduces graphics and audio from a data stream. In such a case, the virtual sensory data can be collected by monitoring run-time data variables available through the operating system of the source device 512, 516 or available from a graphic card or an audio card.

The sensory data representing the environment of the source device 512, 516 can be sent to the recipient device 506, 514 and/or to the server 530. The sensory data can be sent by way of a "pushing" scheme, where data is broadcast or reported from the source device 512, 516 to the recipient device 506, 514 or server 530 as determined by the source device. The sensory data can be sent by way of "pulling" scheme, where data is only sent to the recipient device and/or server 530 when requested by the recipient device and/or server.

In step 604, the recipient device 506, 514 can retrieve sensory information from an environment of the recipient device. The sensory information can represent a physical world or a virtual world of the recipient device. The sensory information can be collected and distributed similarly as the sensory data can be collected and distributed for a source device 512, 516, as described above. For example, the recipient device 506, 514 can capture temperature data by way of a temperature probe or can capture video data by way of a camera, as described above. In step 606, the recipient device 506, 514 can identify characteristics of the environment of the recipient device from the retrieved sensory information. For example, the recipient device can determine a mean value or a range of values for temperature based on captured temperature data. The recipient device can convert captured video into a standard file format or into a series of still images.

In step 608, the recipient device 506, 514 can determine differences between the characteristics of the environment of the source device 512, 516 and the characteristics of the environment of the recipient device. The recipient device 506, 512 can compare the set of characteristics representing the environment of the source device 512, 516 with the set of characteristics representing the environment of the recipient device. The recipient device 506, 514 can compare, for example, a physical environment at the source device 512, 516 with a physical environment at the recipient device 506, 514 by comparing the sensory data from each device. For example, the source device 512, 516 may report bright lighting conditions, such a sunshine, as exhibited by lighting intensity sensory data. By comparison, the recipient device 506, 514 may have identified low-level lighting conditions based on a cloudy day or nighttime or poor indoor lighting. The recipient device 506, 514 can compare the lighting conditions as like categories and detect the differences. Similarly, the recipient device 506, 514 can compare all of the other reported or identified physical sensory data for the two devices, such as temperature, background audio, location, and the like.

For example, the recipient device 506, 514 can detect that background walls at the location of the source device 512, 516 are different than those at the location of the recipient device. The recipient device 506, 514 can detect that the background walls at the location of the source device 512, 516 are smaller or shaped differently than those at the location of the recipient device. The recipient device 506, 514 can detect that the time zone at the location of the source device 512, 516 is different than the time zone at the location of the recipient device. The recipient device 506, 514 can detect that the source device 512, 516 is located at tropical latitude while the recipient device is located in a four-season climate that is currently experiencing winter conditions.

The recipient device 506, 514 can compare value or numerical-based sensory data, such a temperature or light intensity or location coordinates. The recipient device 506, 514 can also compare content-based sensory data, such as video, audio, or still image content to determine differences and can establish where these differences are attributable to the physical environments of the source device 512, 516 and the recipient device 506, 514. The recipient device 506, 514 can also compare presentation resources of the recipient device to those of the source device 512, 516. For example, the source device 512, 516 may have sophisticated surround sound audio resources, while the recipient device 506, 514 has stereo audio presentation resources. Additionally, the source device 512, 516 may have a high definition display resource, while the recipient device 506, 514 has a standard definition display resource.

In addition to comparing physical environments, the recipient device 506, 512 can compare virtual environments. For example, source device 512, 516 can be presenting a virtual-reality video game while recipient device 506, 514 can be presenting a virtual application featuring avatars and virtual persons. The source device 512, 516 and recipient device 506, 514 can each be presenting a different virtual world, each with a virtual environment made up of many characteristics, to the users of the respective devices. The recipient device 506, 512 can compare the set of characteristics representing the virtual environment of the source device 512, 516 with the set of characteristics representing the virtual environment of the recipient device. For example, the source device 512, 516 may report virtual conditions of out-of-doors, darkness, and a storm in the virtual-reality game as exhibited by sensory data of virtual lighting intensity or virtual precipitation or virtual wind. By comparison, the recipient device 506, 514 may have identified low-lighting, but calm, indoor conditions, in the avatar-based game. The recipient device 506, 514 can compare the virtual lighting, weather, and location conditions as like virtual categories and detect differences. Similarly, the recipient device 506, 514 can compare all of the other reported or identified virtual sensory data for the two devices, such as aroma, background audio, images, and the like. The recipient device 506, 514 can determine differences and can establish where these differences are attributable to the virtual environments of the source device 512, 516 and the recipient device 506, 514.

In addition to comparing physical-to-physical and virtual-to-virtual environments, the recipient device 506, 514 can also compare physical-to-virtual and virtual-to-physical environments. For example, the recipient device 506, 514 can compare, for example, a physical environment reported from the source device 512, 516 with a virtual environment presented at the recipient device 506, 514 by comparing the environment characterizations of each device. A characteristic of the virtual environment presented on recipient device 506, 514 can be adapted to imitate a real-world, physical characteristic being experienced at the source device 512, 516. For example, the source device 512, 516 can be at a location experiencing a passing train that can be heard as audio and felt as vibration. Characteristics of audio and/or vibration can be reported from the source device 512, 516, such as by an audio MPEG file, a background noise measurement (frequency, amplitude), or a vibration reading (frequency, amplitude). The recipient device 506, 514 can compare the reported physical sensory data to characteristics of the virtual world presented by the recipient device. The virtual world, for example, can be presenting a noisy restaurant where characteristic components of noise and vibration have been simulated. The recipient device 506, 514 can compare the noise and vibration between the physical world where a train is passing and the virtual world of the restaurant and detect differences that can be important to adapting a media presentation from a physical location of the source device 512, 516 to the virtual "location" of the recipient device.

In step 610, the recipient device 506, 514 can receive media content from the source device 512, 516. The media content can be any combination of text, audio, still images, video, three-dimensional images and video, graphics, or computer-generated media, and virtual gaming or avatar-based content. The media content can be associated with television programming, movies, concerts, news, books, articles, audio communication, text messaging, SMS, instant messaging, weather reports, programming information, community information, captioning, video game applications, virtual world applications, applications including avatars, social media applications, and websites. The media content can originate at the source device 512, 516 or from service provider(s) of the communication networks 100-200. A service provider can provide limited services, such as only providing media programming, or can provide broad-based services, such as media programming, cellular phone, internet access, and on-demand services. These services can serve as an originating point for all or part of the media content at the source device 512, 516. The media content can be a combination of content sourced from the service provider and content generated or modified by the source device 512, 516. The media content can be received by the recipient device 506, 514 directly from the source device 512, 516, can be received by the recipient device 506, 514 from the service provider networks 100-200, or can be received by the recipient device 506, 514 from the server 530.

In step 612, the recipient device 506, 514 can modify a presentation of the media content according to differences between the characteristics of the environment of the source device 512, 516 and the characteristics of the environment of the recipient device 506, 514. In step 614, the recipient device 506, 514 can adapt a user interface 404 of the recipient device 506, 514 according to a difference, or combination of differences, between the characteristics of the environments of the source device 512, 516 and the recipient device. The recipient device 506, 514 can modify characteristics of a display 410 on a user interface 404 of the recipient device 506, 514 or of a user interface, such as display 508, in communication with the recipient device. For example, the source device 512, 516 can be located in bright conditions, while the recipient device 506, 514 is located in dark conditions. The recipient device 506, 514 can detect the difference in environment and adjusts settings on the display 404, 508, such as brightness, backlighting, or contrast. The recipient device 506, 514 can adjust an audio system 412 to account for difference in background noise between the recipient device and the source device 512, 516.

The recipient device 506, 514 can also modify the user interface 404 to account for differences between physical and virtual worlds or between two virtual worlds. For example, a user of the source device 512, 516, such as computing device, can be watching a music video within a virtual reality, avatar-based application presented on the computing device (e.g., the user's avatar is watching the video). The user can decide to share this virtual experience with someone else on a recipient device 506, 514 in the form of a mobile phone. The user of the user of the source device 512, 516 can initiate a sharing of the music video content with the user of the recipient device 506, 514 by, for example, sending a text with a link that directs the recipient device 506, 514 to the source device 512, 516. The recipient device 506, 514 can receive the music video (media content) from the source device 512, 516 along with sensory data representing the virtual environment that the source device 512, 516 is presenting. The recipient device 506, 514 can compare the received, virtual environment characteristics of the source device 512, 516 with retrieved and identified characteristics of the physical environment of the recipient device 506, 514. The recipient device 506, 514 can determine, for example, that the virtual world presentation of the music video includes a background sound of a virtual fountain. The recipient device 506, 514 can alter the audio system 412 of the mobile phone to account for the presence of the fountain at the source device 512, 516 either by adding a fountain sound to a reproduction of the music video through the mobile phone audio system 412 (to share the complete experience of the source device user) or by reducing the playback volume of the music video through the audio system (to account for a quieter listening environment for the recipient device user).

The recipient device 506, 514 can translate or transcode the media content according to the differences between the characteristics of the environment of the source device 512, 516 and the characteristics of the environment of the recipient device 506, 514 in step 616. The recipient device 506, 514 can modify the format of the media content, can change the encoding scheme used for the media content, or can alter the media content to account for the detected environment differences when the media content presented by or on the recipient device 506, 514. For example, the source device 512, 516 can be presenting a live cam video feed of a flock of penguins in Antarctica to a user who is riding on a subway train. The user of the source device 512, 516 decides to share this television show with a user of a recipient device 506, 514. The recipient device 506, 514 can be presenting, at the same time, a virtual reality application where the user of the recipient device 506, 514 is "living" in a virtual city. The user of the recipient device 506, 514 can be attending a football game in the virtual-reality city. A scoreboard at the virtual football game can be used to display video. Various physical world phenomena at the source device 512, 516 can be retrieved by the recipient device 506, 514 as sensory data characterizing the source device environment. The recipient device 506, 514 can detect differences between the source and recipient devices. For example, the recipient device 506, 514 can transcode the media content from the source device 512, 516 to work in the virtual environment by converting from a streaming video format to an embedded video format, such as Flash™ video, a trademark of the Adobe Corporation of San Jose, Calif.

In another illustration, the media content can be in the form of content of a virtual reality world being presented on the source device 512, 516. For example, the source device 512, 516 can be presenting a virtual reality application where an avatar of a user "lives" in a house. The house can have elements of home décor such as paintings, wall colors, and landscaping. The user decides to share her home in her virtual reality application with a user of the recipient device 506, 514, who is also a "resident" in a virtual reality application. In the context of the virtual reality application, the décor elements can be identified as characteristics of the environment of the user of the source device 512, 516. Therefore, the recipient device 506, 514 can receive the décor elements as characteristics of the source device virtual environment and compare these characteristics to the virtual environment of the recipient device 506, 514. The user of the recipient device 506, 514 can have different décor—paintings, colors, landscaping—at his house. The recipient device 506, 514 can detect these differences and alter the content of the first user's house, as presented to the second user at the recipient device 506, 514. The recipient device 506, 514 can translate the first house by substituting part of the content of the second house (to make the second user feel more at home in his friend's house).

Figure 7:
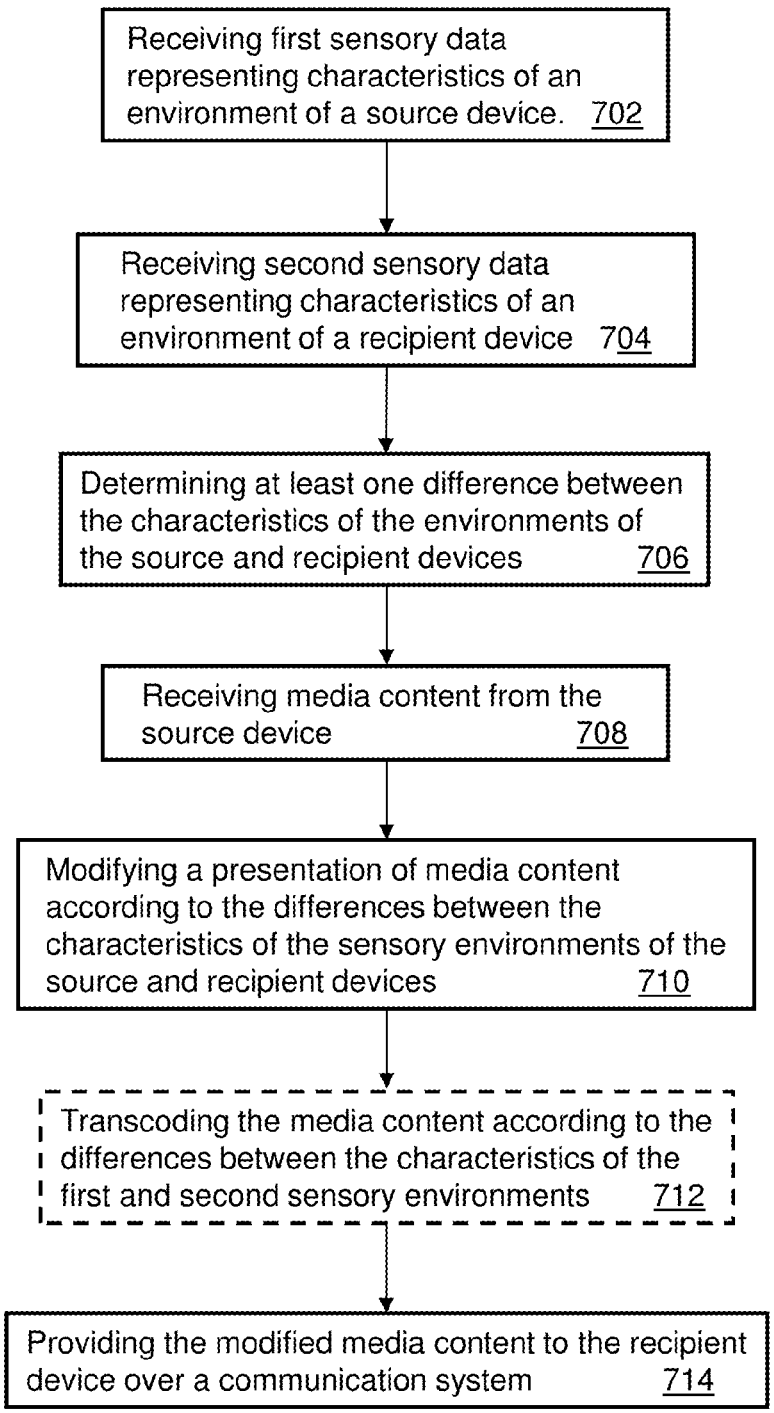

FIG. 7 depicts an illustrative method 700 that operates in portions of the devices of FIGS. 1-5. Method 700 can begin with step 702 in which a server 530 can receive first sensory data representing characteristics of an environment 542, 546 of a source device 512, 516. The server 530 can be used as a media adaptation server. The first sensory data can represent characteristics of the environment 542, 546 of the source device 512, 516 that can be derived from a "physical world" in which the device is located or from a "virtual world" being presented by the source device 512, 516, as described above. In step 704, the server 530 can receive second sensory data representing characteristics of an environment 544, 548 of the recipient device 506, 514. The second sensory data can represent characteristics of the environment 544, 548 that can be derived from a "physical world" in which the device is located or from a "virtual world" being presented by the recipient device 506, 514, as described above. Since the server 530 can be located remotely from the recipient device 506, 514, the recipient device can report sensory data to the server 530 in a fashion similar to the reporting of sensory data by the source device 512, 516 described in the prior embodiment.

In step 706, the server 530 can determine differences between the characteristics of the environments of the source device 512, 516 and the recipient device 506, 514. The server 530 can compare the set of characteristics representing the environment of the source device 512, 516 with the set of characteristics representing the environment of the recipient device 506, 514. The server 530 can compare, for example, a physical environment at the source device 512, 516 with a physical environment at the recipient device 506, 514 by comparing the sensory data from each device. The server 530 can determine differences and can establish where these differences are attributable to the physical or virtual environments of the source device 512, 516 and the recipient device 506, 514. The server 530 can determine differences between characteristics of the environments of the source device 512, 516 and the recipient device 506, 514 by similar means, and with similar capabilities, as can be used by the recipient device 506, 514.

In step 708, the server 530 can receive media content from the source device 512, 516. The media content can be any combination of text, audio, still images, video, three-dimensional images and video, graphics, or computer-generated media, and virtual gaming or avatar-based content. The media content can be a combination of content sourced from the service provider and content generated or modified by the source device 512, 516. The media content can be received by the server 530 directly from the source device 512, 516 or can be received by the server 530 from another device of the service provider of networks 100-200.

In step 710, the server 530 can modify a presentation of media content according to the differences between the characteristics of the sensory environments of the source device 512, 516 and the recipient device 506, 514. The server 530 can translate or transcode the media content according to the differences between the characteristics of the environment of the source device 512, 516 and the characteristics of the environment of the recipient device 506, 514, in step 712. The server 530 can modify the format of the media content, can change the encoding scheme used for the media content, or can alter the media content to account for the detected environment differences when the media content is presented by or on the recipient device 506, 514. The server 530 can modify the media content by similar means, and with similar capabilities, as can be used by the recipient device 506, 514.

In step 714, the server 530 can provide the modified media content to the recipient device 506, 514 over the communication system 100. The sever 530 can provide the modified media content as a file, as streaming data, or embedded in a message.

Upon reviewing the aforementioned embodiments, it would be evident to an artisan with ordinary skill in the art that said embodiments can be modified, reduced, or enhanced without departing from the scope and spirit of the claims described below. In one embodiment, the recipient device 506, 514 or the server 530 can use object recognition applications to compare known patterns, objects, shapes, sounds, and/or places that appear in the video, audio, or still image content reported or identified as being of the source device 512, 516 and/or the recipient device 506, 514. By comparing recognized objects, patterns, shapes, sounds, and/or places, differences in the environments of the source device 512, 516 and the recipient device 506, 514 can be determined to guide modification of the media content or of the user interface of the recipient device 506, 514.

In one embodiment, the recipient device 506, 512 or the server 540 can use object recognition applications to compare known patterns, objects, shapes, sounds, and/or places that appear in any virtual video, audio, or still image content reported or identified for the source device 512, 516 and/or the recipient device 506, 514. Other embodiments are contemplated by the present disclosure.

Figure 8:
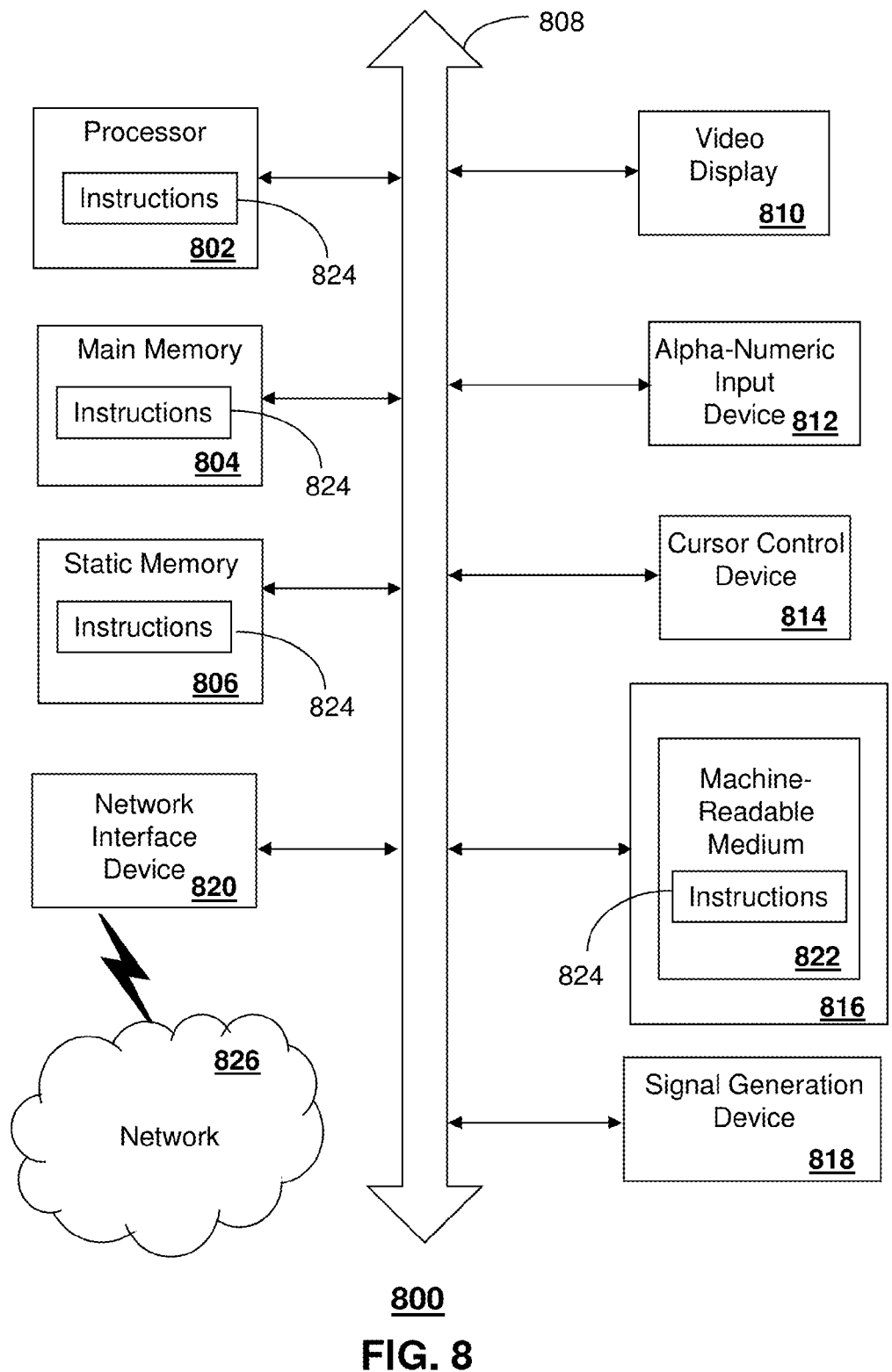
FIG. 8 is a diagrammatic representation of a machine in the form of a computer system within which a set of instructions, when executed, may cause the machine to perform any one or more of the methods discussed herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the server 503, the media processor 506, the display 508, computing devices 512, mobile devices 514, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A recipient device, comprising:
a recipient sensor;
a processing system including a processor; and
a memory that stores executable instructions that, when executed by the processing system, facilitate performance of operations, comprising:
receiving first statistical lighting information calculated from first sensory data representing a first lighting condition of a first real world environment sensed by a source sensor coupled to a source device;
retrieving second statistical lighting information calculated from second sensory data representing a second lighting condition of a second real world environment sensed by the recipient sensor;
determining a difference between the first lighting condition of the first real world environment and the second lighting condition of the second real world environment according to a difference between the first statistical lighting information and the second statistical lighting information;
receiving media content from the source device; and
adding to the media content a modified reproduction of the first lighting condition, wherein the modified reproduction of the first lighting condition is determined according to the difference between the first lighting condition of the first real world environment and the second lighting condition of the second real world environment.

2. The recipient device of claim 1, wherein the operations further comprise presenting the media content with the modified reproduction of the first lighting condition.

3. The recipient device of claim 1, wherein the first real world environment of the source device further comprises first physical images of the first real world environment and wherein the operations further comprise altering an image in the media content according to first physical images of the first real world environment.

4. The recipient device of claim 1, wherein the operations further comprise:
receiving second sensory information representing first audio of the first real world environment of the source device; and
modifying the media content according to the first audio of the first real world environment.

5. The recipient device of claim 1, wherein the first real world environment of the source device further comprises a first physical temperature that is sensed by the source device, wherein the second real world environment further comprises second physical temperature, and wherein the operations further comprise modifying the media content to reflect a temperature difference between the first real world environment and the second real world environment.

6. The recipient device of claim 1, wherein the operations further comprise transcoding the media content according to the difference between the first lighting condition and the second lighting condition.

7. The recipient device of claim 1, wherein the first statistical lighting information includes a mean or a median of the first sensory data.

8. The recipient device of claim 1, wherein the operations further comprise modifying a user interface of the recipient device according to the difference between the first lighting condition and the second lighting condition.

9. The recipient device of claim 1, wherein the media content comprises a first virtual world environment that is simulated by the source device.

10. The recipient device of claim 9, wherein the first virtual world environment is generated at the source device by one of a video game application, a virtual world application, an application including avatars, a social media application, or any combination thereof.

11. The recipient device of claim 9, wherein the operations further comprise generating a second virtual world environment at the recipient device.

12. The recipient device of claim 11, wherein the first virtual world environment and the second virtual environment are generated by a common application.

13. A device, comprising:
a processing system including a processor; and
a memory that stores executable instructions that, when executed by the processing system, facilitate performance of operations, comprising:
receiving first statistical lighting information calculated from first sensory data representing a first lighting condition of a first real world environment sensed by a sensor of a source device;
receiving second statistical lighting information calculated from second sensory data representing a second lighting condition of second real world environment sensed by a recipient device;
determining a difference between the first lighting condition of the first environment and the second lighting condition of the second environment according to a difference between the first statistical lighting information and the second statistical lighting information;
generating a modified reproduction of media content to mimic the first lighting condition according the difference between the first lighting condition and the second lighting condition; and
transmitting the modified reproduction of the media content to the recipient device over a communication system.

14. The device of claim 13, wherein the first real world environment of the source device further comprises first physical images of the first real world environment and wherein the operations further comprise altering an image in the media content according to first physical images of the first real world environment.

15. The device of claim 13, wherein the media content comprises a first virtual world environment that is simulated by the source device.

16. The device of claim 15, wherein the first virtual world environment is generated at the source device by one of a video game application, a virtual world application, an application including avatars, a social media application, or any combination thereof.

17. The device of claim 15, wherein the operations further comprise generating a second virtual world environment at the recipient device.

18. A method, comprising:
receiving, by a processing system including a processor, first statistical lighting information calculated from first sensory data representing a first lighting condition of a first real world environment sensed by a source sensor coupled to a source device, wherein the first real world environment of the source device further comprises a first physical temperature that is sensed by the source device;
retrieving, by the processing system, second statistical lighting information calculated from second sensory data representing a second lighting condition of a second real world environment sensed by a recipient sensor, wherein the second real world environment further comprises second physical temperature;
determining, by the processing system, a difference between the first lighting condition of the first real world environment and the second lighting condition of the second real world environment according to a difference between the first statistical lighting information and the second statistical lighting information;
receiving, by the processing system, media content from the source device; and
adding to the media content, by the processing system, a modified reproduction of the first lighting condition, wherein the modified reproduction of the first lighting condition is determined according to the difference between the first lighting condition of the first real world environment and the second lighting condition of the second real world environment; and
modifying, by the processing system, the media content to reflect a temperature difference between the first real world environment and the second real world environment.

19. The method of claim 18, further comprising presenting, by the processing system, the media content with the modified reproduction of the first lighting condition.

20. The method of claim 18, wherein the first real world environment of the source device further comprises first physical images of the first real world environment, and further comprising altering, by the processing system, an image in the media content according to first physical images of the first real world environment.

* * * * *